United States Patent
Yamamoto

(10) Patent No.: US 9,800,714 B2
(45) Date of Patent: Oct. 24, 2017

(54) CONTROL METHOD, INFORMATION PROCESSING DEVICE, AND STORAGE MEDIUM

(71) Applicant: FUJITSU LIMITED, Kawasaki-shi, Kanagawa (JP)

(72) Inventor: Masahiro Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/983,454

(22) Filed: Dec. 29, 2015

(65) Prior Publication Data
US 2016/0248901 A1 Aug. 25, 2016

(30) Foreign Application Priority Data

Feb. 20, 2015 (JP) .................................. 2015-031893

(51) Int. Cl.
| | |
|---|---|
| H04M 1/725 | (2006.01) |
| H04W 4/02 | (2009.01) |
| H04B 1/3827 | (2015.01) |
| H04W 12/08 | (2009.01) |
| H04W 4/00 | (2009.01) |
| H04W 12/06 | (2009.01) |
| H04W 88/02 | (2009.01) |

(52) U.S. Cl.
CPC ........ *H04M 1/72569* (2013.01); *H04B 1/385* (2013.01); *H04M 1/72577* (2013.01); *H04W 4/027* (2013.01); *H04W 12/08* (2013.01); *H04W 4/008* (2013.01); *H04W 12/06* (2013.01); *H04W 88/02* (2013.01)

(58) Field of Classification Search
CPC ......... H04M 1/72569; H04M 1/72577; H04W 4/008; H04W 4/027; H04W 12/06; H04W 12/08; H04W 88/02; H04B 1/385
See application file for complete search history.

(56) References Cited

U.S. PATENT DOCUMENTS

2013/0171971 A1 7/2013 Fujii et al.
2015/0286813 A1* 10/2015 Jakobsson ............... G06F 21/35
726/9

FOREIGN PATENT DOCUMENTS

EP 2369821 9/2011
EP 2610708 7/2013
(Continued)

OTHER PUBLICATIONS

Chuong H Nguyen, "Personal Unlocking makes security simple in Android L", URL: http://www.androidcentral.com/personal-unlocking-makes-security-simple, searched on Jan. 29, 2015, online.
(Continued)

*Primary Examiner* — Marcos Torres
(74) *Attorney, Agent, or Firm* — Fujitsu Patent Center

(57) ABSTRACT

A control method executed by an information processing device having a function of wirelessly communicating with a wearable device and locking function of restricting operation of the information processing device, the control method includes acquiring acceleration information by an acceleration sensor; receiving information that is transmitted from the wearable device and relates to acceleration applied to the wearable device; and releasing the lock when the acceleration information acquired by the acceleration sensor matches the information relating to the acceleration.

17 Claims, 15 Drawing Sheets

(56) References Cited

FOREIGN PATENT DOCUMENTS

| | | |
|---|---|---|
| JP | 2013-140415 | 7/2013 |
| JP | 2014-123204 | 7/2014 |
| WO | 2015/065494 A1 | 5/2015 |

OTHER PUBLICATIONS

EESR—The Extended European Search Report dated Jun. 20, 2016 from corresponding to EPC Patent Application No. 15201372.8.

* cited by examiner

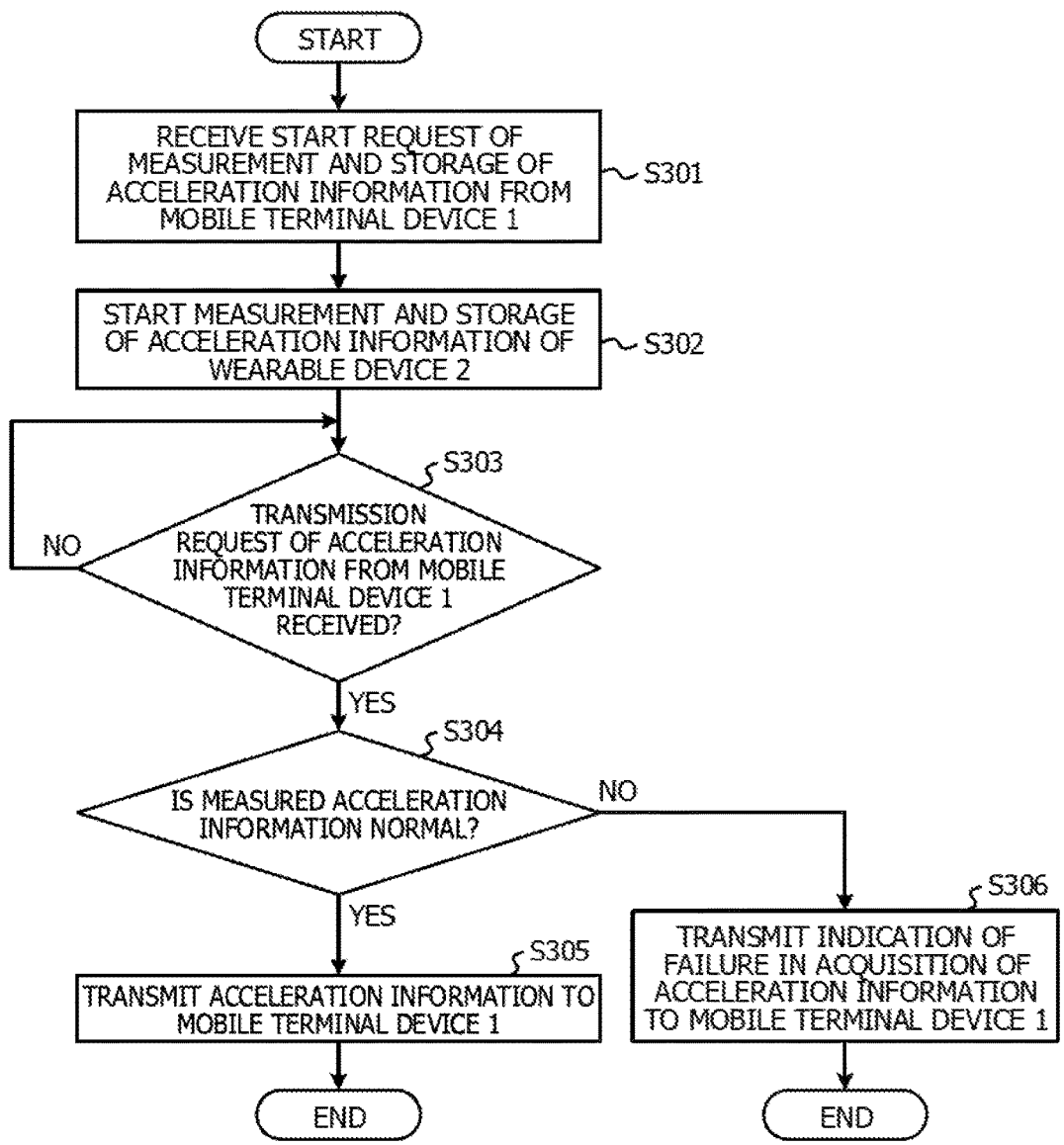

FIG. 9A

| MESSAGE TYPE :
0x01 |

FIG. 9B

| MESSAGE TYPE :
0x02 |

FIG. 9C

| MESSAGE TYPE :
0x03 | INFORMATION LENGTH:
LENGTH (BYTE) OF
"ACCELERATION INFORMATION" | ACCELERATION
INFORMATION
(VARIABLE LENGTH) |

CONTROL METHOD, INFORMATION PROCESSING DEVICE, AND STORAGE MEDIUM

CROSS-REFERENCE TO RELATED APPLICATION

This application is based upon and claims the benefit of priority of the prior Japanese Patent Application No. 2015-031893, filed on Feb. 20, 2015, the entire contents of which are incorporated herein by reference.

FIELD

The embodiments discussed herein are related to a control method, an information processing device, and a storage medium.

BACKGROUND

In recent years, mobile terminal devices such as smartphones generally have a function that is able to provide a so-called locked state that restricts entry operation when there has been no operation for a predetermined period of time and to release the lock upon personal authentication when entry operation is started. This function allows for prevention of information leakage to a third party, because the mobile terminal device may not be used unless the personal authentication is successful. As a method of personal authentication, there are known methods involving entry of a personal identification number or a password and methods involving biological information such as a fingerprint, a face, an iris, a retina, a vein, a palm shape, DNA, a voice, a signature, an auricular, or the like, for example.

Further, as a technique that can omit entry operation for personal authentication, Japanese Laid-open Patent Publication No. 2014-123204 discusses a method of performing personal authentication by using an equipped wearable device. This is a technique in which a wearable device and a mobile terminal device have been set in advance to be able to communicate with each other by Bluetooth (registered trademark), and the mobile terminal device can be unlocked when the wearable device is located near the mobile terminal device and the communication by Bluetooth is established.

As another technique that can omit entry operation, Chuong H Nguyen, "Personal Unlocking makes security simple in Android L", Internet website, URL: http://www.androidcentral.com/personal-unlocking-makes-security-simple, searched on Jan. 29, 2015, online, discusses a technique in which, after mutual authentication between a smartphone and a wrist-watch-type wrist terminal, a user performs an unlocking operation on the wrist terminal, and the wrist terminal then transmits an unlocking command to the smartphone.

According to the technique disclosed in Japanese Laid-open Patent Publication No. 2014-123204, however, a third party is able to unlock a smartphone when the wearable device is located near the smartphone. For example, it is assumed that a user is wearing a wearable device and a third party places a user's smartphone in a location such as a neighboring room where mutual communication by Bluetooth is available but which is out of sight of the user. In this case, the third party is able to unlock the smartphone.

According to Chuong H Nguyen, "Personal Unlocking makes security simple in Android L", although entry operation at the smartphone side for releasing the lock is unnecessary, entry operation at the wearable device side is still involved. In view of the techniques discussed above, a simpler unlocking operation with high security is desirable in an information processing device such as a mobile terminal device.

SUMMARY

According to an aspect of the invention, a control method executed by an information processing device having a function of wirelessly communicating with a wearable device and locking function of restricting operation of the information processing device, the control method includes: acquiring acceleration information by an acceleration sensor; receiving information that is transmitted from the wearable device and relates to acceleration applied to the wearable device; and releasing the lock when the acceleration information acquired by the acceleration sensor matches the information relating to the acceleration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a flowchart illustrating an example of a process executed by the wearable device, according to the first embodiment;

FIG. 9A, FIG. 9B and FIG. 9C are general diagrams of formats of various messages according to the first embodiment;

DESCRIPTION OF EMBODIMENTS

In view of the foregoing, it is an object of the disclosure is to conduct simpler unlocking operation with high security in an information processing device such as a mobile terminal device.

Hereinafter, the embodiments will be described in detail with reference to FIG. 1 to FIG. 15.

First Embodiment

Figure 1:
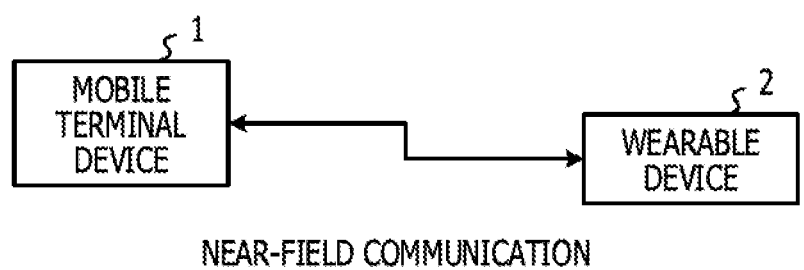
FIG. 1 is a system configuration diagram according to a first embodiment.

FIG. 1 is a system configuration diagram according to a first embodiment. As illustrated in FIG. 1, the system of the present embodiment includes a mobile terminal device 1 and a wearable device 2. The mobile terminal device 1 is an information processing device involving personal authentication at a start of operation, and can be a smartphone, a mobile phone, a tablet terminal, or the like, for example. The wearable device 2 is a computer that can be carried by a user. The wearable device 2 is a wrist-watch-type device, for example. The wearable device 2 can be utilized in personal authentication executed by the mobile terminal device 1. In the present embodiment, the mobile terminal device 1 and the wearable device 2 can communicate with each other by using a near-field wireless communication technique (such as Bluetooth, for example).

Figure 2:
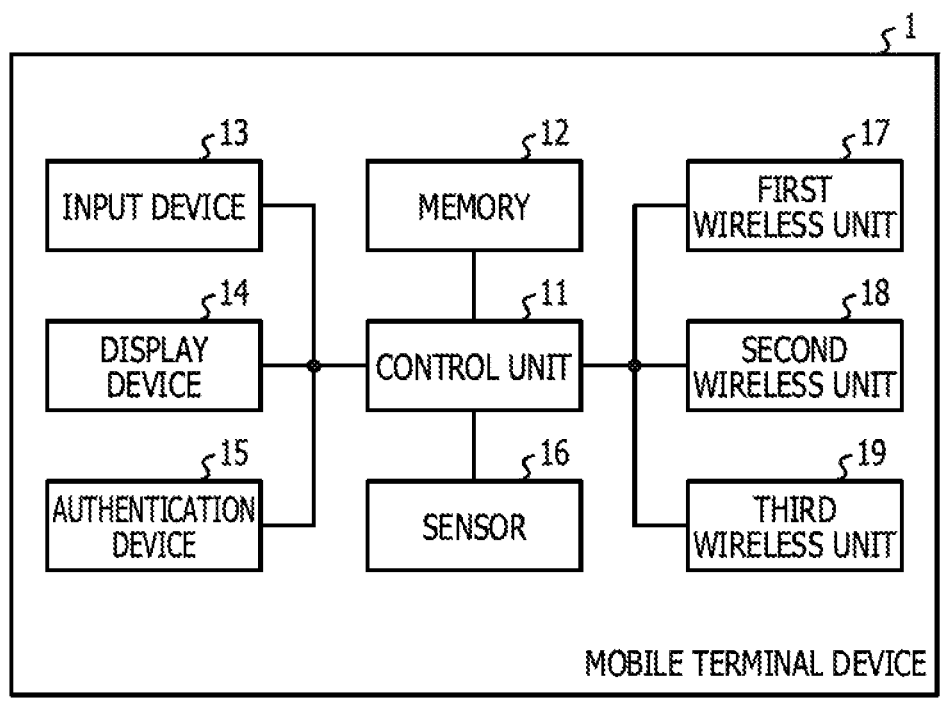
FIG. 2 is a diagram illustrating an example of a hardware configuration of a mobile terminal device, according to the first embodiment.

FIG. 2 is a diagram illustrating an example of a hardware configuration of the mobile terminal device 1, according to the first embodiment. As illustrated in FIG. 2, the mobile terminal device 1 includes a control unit 11, a memory 12, an input device 13, a display device 14, an authentication device 15, a sensor 16, a first wireless unit 17, a second wireless unit 18, and a third wireless unit 19.

The control unit 11 is a piece of hardware that manages the entire process of the mobile terminal device 1. The control unit 11 is a CPU (Central Processing Unit), for example. Various functions of the control unit 11 will be described later. The memory 12 is hardware that stores therein data and programs used for the process executed by the control unit 11. The memory 12 may be a RAM (Random Access Memory), a flash memory, or a ROM (Read Only Memory), for example, or may be any combination thereof. For example, a RAM and a NAND type flash memory can be used for storage of data. On the other hand, a NOR type flash memory and a ROM can be used for storage of programs. The memory 12 can be formed of a plurality of memory devices depending on the application or a desired storage capacity.

The input device 13 is a device through which the user of the mobile terminal device 1 inputs information. The input device 13 is a touch screen, keys, or the like, for example. The display device 14 is a device that displays resulting information processed by the control unit 11. The display device 14 is implemented by a liquid crystal display, for example.

The authentication device 15 is an electronic component utilized for personal authentication. The authentication device employs an authentication method using direct entry of character information such as a password, for example, or an authentication method using biological information. When biological information is used, a face, an iris, a retina, a vein, a palm shape, DNA, a voice, a signature, an auricular, or the like can be used as the biological information. The sensor 16 is a sensor for detecting a position and/or an orientation of the mobile terminal device 1. The sensor 16 is an acceleration sensor, for example.

The first wireless unit 17 is a piece of hardware for communicating with the mobile terminal device 1 and with a remote base station or a remote server apparatus by using a cellular communication system such as GSM (Global System for Mobile communication (registered trademark)), 3G (3rd Generation), LTE (Long Term Evolution), or the like. The second wireless unit 18 is a piece of hardware for establishing a short or middle range LAN connection by using Wi-Fi (Wireless Fidelity). The third wireless unit 19 is a piece of hardware for performing near-field communication with the wearable device 2 by using Bluetooth, which is a low-power wireless technology. The first wireless unit 17, the second wireless unit 18, and the third wireless unit 19 each have interfaces corresponding to a transmission unit and a receiving unit, respectively.

Figure 3:
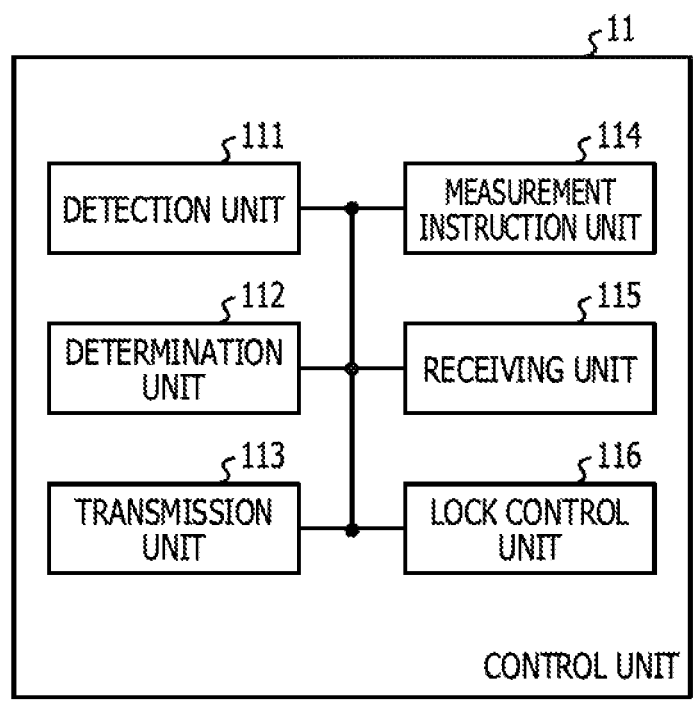
FIG. 3 is a functional block diagram of a control unit illustrated in FIG. 2.

FIG. 3 is a functional block diagram of the control unit 11. As illustrated in FIG. 3, the control unit 11 includes a detection unit 111, a determination unit 112, a transmission unit 113, a measurement instruction unit 114, a receiving unit 115, and a lock control unit 116.

The detection unit 111 detects that an operation for starting use of the mobile terminal device 1, such as turning on the power of the mobile terminal device 1, is performed by a user. The determination unit 112 performs various determination processing to be executed in the control unit 11. The transmission unit 113 transmits to the wearable device 2 a message indicating a start request for starting a process of measuring acceleration information and storing the measured result. The transmission unit 113 transmits to the wearable device 2 a message indicating a termination request for terminating measurement and storage of acceleration.

The measurement instruction unit 114 executes an instruction for starting measurement of acceleration information of the wearable device 2 and storage of the measured result. The receiving unit 115 receives acceleration information transmitted from the wearable device 2. The lock control unit 116 controls an unlocking of the mobile terminal device 1 based on the determination result from the determination unit 112.

Figure 4:
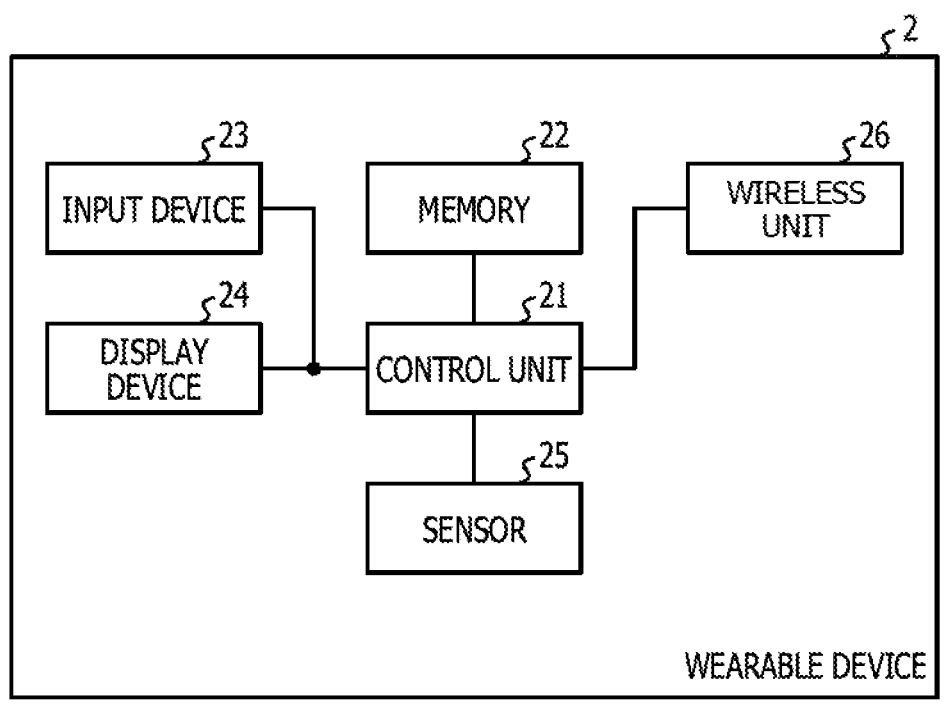
FIG. 4 is a diagram illustrating an example of a hardware configuration of a wearable device, according to the first embodiment.

FIG. 4 is a diagram illustrating an example of a hardware configuration of the wearable device 2, according to the first embodiment. As illustrated in FIG. 4, the wearable device 2 includes a control unit 21, a memory 22, an input device 23, a display device 24, a sensor 25, and a wireless unit 26.

The control unit 21 is a piece of hardware that manages the entire process of the wearable device 2. The control unit 21 is a CPU, for example. The memory 22 is a piece of hardware that stores therein data and programs used for the process executed by the wearable device 2. The memory 22 can be formed of a plurality of memory devices in a manner similar to the memory 12.

The input device 23 is a device through which the user of the wearable device 2 inputs information. The input device 23 is a touch screen, keys, or the like, for example. The display device 24 is a device that displays resulting information processed by the control unit 21. The display device 24 is implemented by a liquid crystal display, for example.

The sensor 25 is a sensor for detecting a position and/or an orientation of the wearable device 2. The sensor 25 is an acceleration sensor, for example. The wireless unit 26 is a piece of hardware for performing near-field communications with the mobile terminal device 1. The wireless unit 26 has interfaces corresponding to a transmission unit and a receiving unit, respectively.

Figure 5:
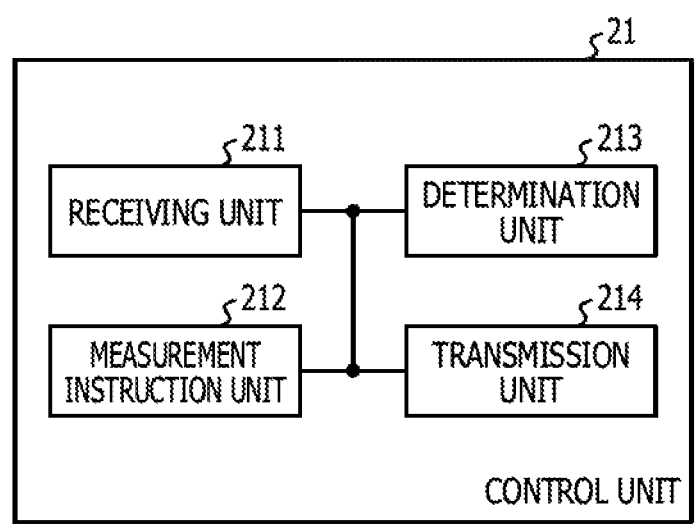
FIG. 5 is a functional block diagram of a control unit illustrated in FIG. 4.

FIG. 5 is a functional block diagram of the control unit 21. As illustrated in FIG. 5, the control unit 21 includes a receiving unit 211, a measurement instruction unit 212, a determination unit 213, and a transmission unit 214.

The receiving unit 211 receives from the mobile terminal device 1 a message indicating a start request for starting a process of measuring acceleration information and storing the measured result. The receiving unit 211 receives from the mobile terminal device 1 a message indicating a transmission request for transmitting acceleration information. The receiving unit 211 receives from the mobile terminal device 1 a message indicating a termination request for terminating measurement and storage of acceleration.

The measurement instruction unit 212 executes an instruction for starting measurement of acceleration information of the wearable device 2 and storage of the measured result. The determination unit 213 executes various determination processes executed in the control unit 21. The transmission unit 214 transmits acceleration information to the mobile terminal device 1 upon receiving a transmission request. When it is determined that the measured acceleration information is not normal, the transmission unit 214 transmits an indication of failure in acquisition of acceleration information to the mobile terminal device 1.

Figure 6:
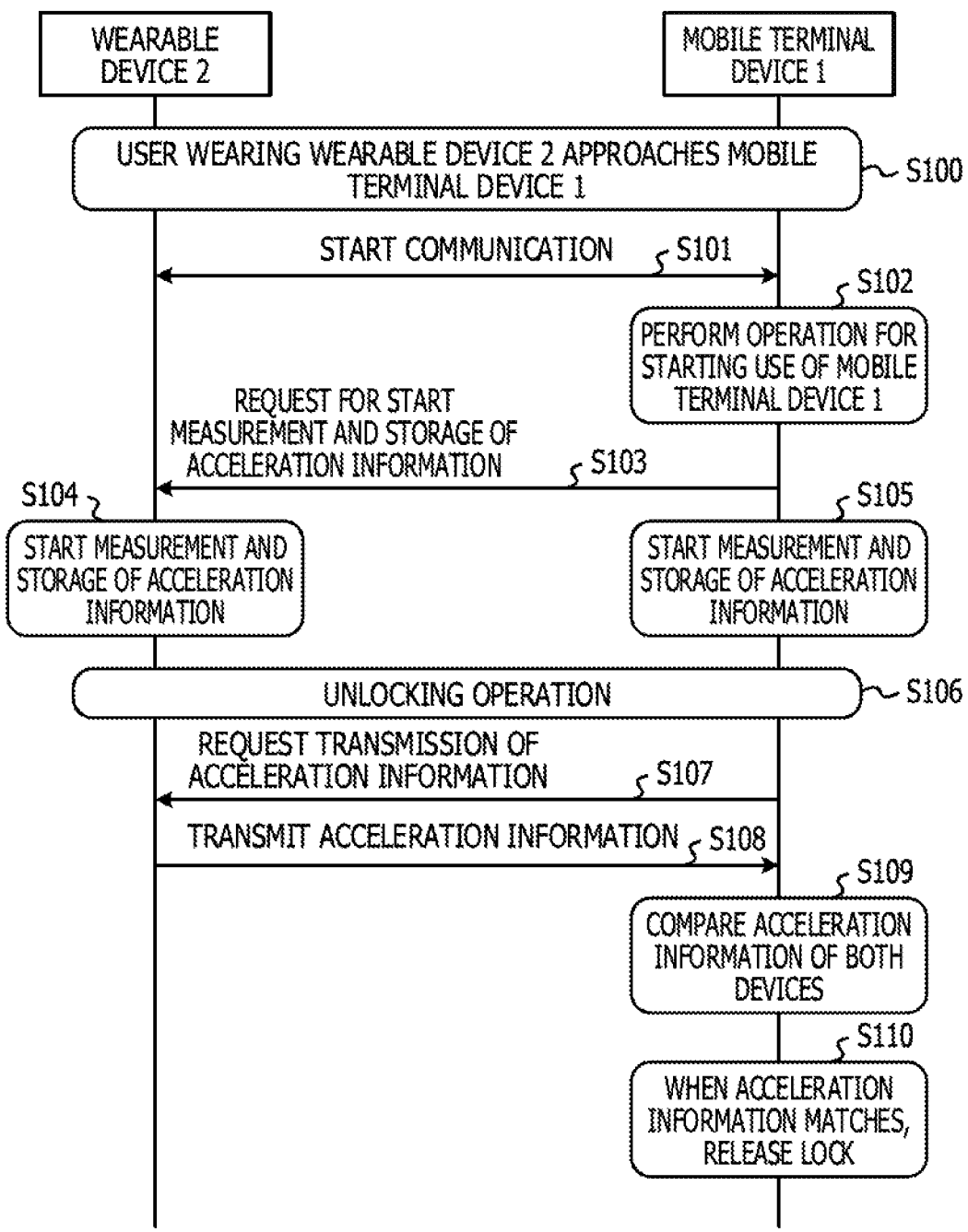
FIG. 6 is a sequence diagram illustrating an example of a processing method by the system, according to the first embodiment.

FIG. 6 is a sequence diagram illustrating an example of a processing method performed by the system, according to the first embodiment. First, a user wearing the wearable device 2 approaches the mobile terminal device 1 (S100). Then, when the user enters a range where Bluetooth communication can be established, for example, mutual communication is started (S101).

The user is not necessarily carrying the mobile terminal device 1 and may leave his/her seat with the mobile terminal device 1 left placed on the desk. In any case, however, when the user wearing the wearable device 2 intends to use the mobile terminal device 1, the user moves to pick up the mobile terminal device 1 and thus the distance between the mobile terminal device 1 and the wearable device 2 becomes short enough for Bluetooth communication to be established.

When the user performs an operation to start use of the mobile terminal device 1, such as turning on the power of the mobile terminal device 1, for example (S102), the mobile terminal device 1 transmits to the wearable device 2 a message indicating a start request for starting a process of measuring acceleration information and storing the measured result (S103). In response, the wearable device 2 that has received the message starts measurement of acceleration information of the wearable device 2 and storage of the measured result (S104). On the other hand, the mobile terminal device 1 also starts measurement of acceleration information of the mobile terminal device 1 and storage of the measured result (S105). Here, "motion" refers to a situation in which a position or an orientation of a device changes in a three-dimensional space. Specifically, it refers to a transition of temporal changes in acceleration. That is, the mobile terminal device 1 and the wearable device 2 are able to acquire acceleration information that is caused by a motion of the device itself.

The detection and storage of a motion can be executed at all times. In a terminal such as the wearable device 2 in particular, which is compact and whose battery capacity is limited, however, it is preferable to execute the detection and storage only at desired time in view of power saving. According to the method described above, upon the wearable device 2 receiving a message from the mobile terminal device 1, measurement and storage of acceleration information is started by the wearable device 2. This allows for power saving of the wearable device 2. In the mobile terminal device 1, when its battery capacity is sufficient, the method of detecting and storing acceleration information at all times can be used.

After performing the operation to start use of the mobile terminal device 1, the user performs an unlocking operation (S106). At S106, the user performs an unlocking operation by performing a motion such as shaking the mobile terminal device 1 one or more times, for example. The shaking may be in any direction and/or at any strength. However, a somewhat large motion is preferable for accurate detection. After the unlocking operation has been performed, the mobile terminal device 1 transmits to the wearable device 2 a transmission request for acceleration information (S107). Then, the wearable device 2 that has received the transmission request transmits the acceleration information stored therein to the mobile terminal device 1 (S108).

Next, the mobile terminal device 1 compares the acceleration information measured and stored by the mobile terminal device 1 with the acceleration information received from the wearable device 2 (S109). Specifically, it is determined whether or not the acceleration information measured by the mobile terminal device 1 matches the acceleration information measured by the wearable device 2.

Here, "match" means that both have a predetermined relationship. For example, not only when both pieces of acceleration information fully match, but also when both pieces of acceleration information partially match, or when a correlation of both is greater than or equal to a predetermined threshold, it can be determined that both pieces of acceleration information match. For example, a motion of shaking the mobile terminal device 1 by the hand on which the wrist watch-type wearable device 2 is worn results in the acceleration data measured and stored by both devices becoming substantially the same temporal data. When there is a motion of shaking the mobile terminal device 1 by the other hand on which the wrist watch-type wearable device 2 is not worn or when the wearable device 2 is equipped not on the wrist but on the upper arm or other part of the body, there will be some correlation between the temporal data of the sensor data detected by both devices. When both pieces of acceleration information match, the mobile terminal device 1 releases the lock (S110).

In a manner as described above, unlocking of the mobile terminal device 1 by using the wearable device 2 can be executed.

Figure 7:
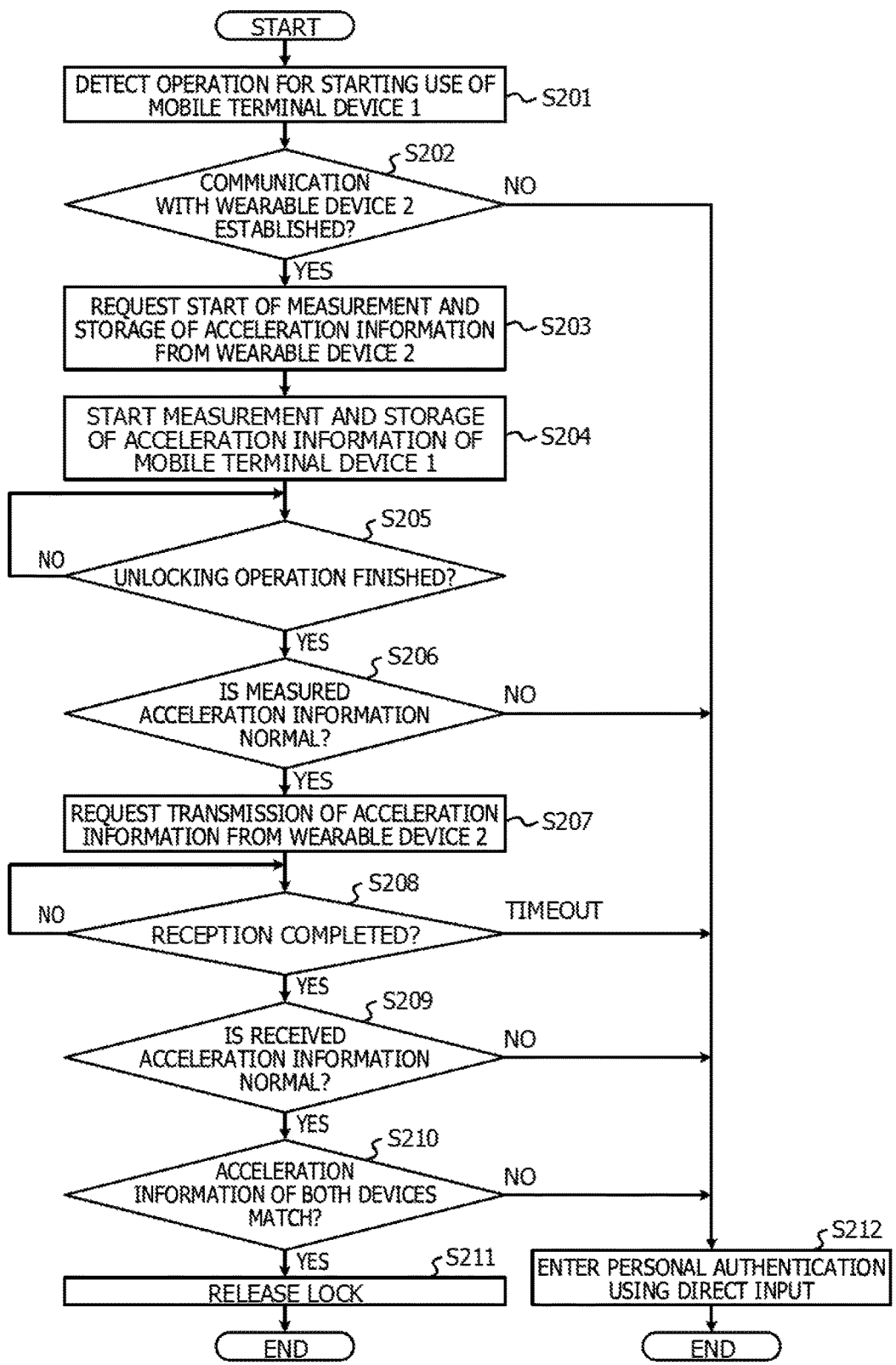
FIG. 7 is a flowchart illustrating an example of a process executed by the mobile terminal device, according to the first embodiment.

In the following, a process flow at the mobile terminal device 1 will be described in detail by using FIG. 7. FIG. 7 is a flowchart illustrating an example of a process executed by the mobile terminal device, according to the first embodiment.

First, an operation for starting use of the mobile terminal device 1, such as turning on the power of the mobile terminal device 1, is performed by the user. In response, the detection unit 111 detects that the operation has been performed (S201).

Next, the determination unit 112 determines whether or not near-field communication with the wearable device 2 is established (S202). If it is determined that near-field communication with the wearable device 2 is not established (S202: No), in order to unlock the mobile terminal device 1, the process enters a conventional personal authentication procedure applying direct input to the mobile terminal device 1 by using the authentication device 15 (S212). In the personal authentication procedure, personal authentication is performed by direct input of a password, for example. On the other hand, if it is determined that near-field communication with the wearable device 2 is established (S202: Yes), the transmission unit 113 transmits to the wearable device 2 a message requesting that a process of measuring acceleration information and storing the measured result be started (S203). The measurement instruction unit 114 then causes the sensor 16 to start measurement of acceleration information of the mobile terminal device 1 and storage of the measured result (S204). After the measurement of acceleration information is started, the user wearing the wearable device 2 performs an unlocking motion such as shaking the mobile terminal device 1. The sensor 16 then measures changes in the acceleration of the mobile terminal device 1 caused by the unlocking motion. The sensor 16 then stores information of the acquired acceleration in the memory 12 as acceleration information.

Next, the determination unit 112 determines whether or not the unlocking motion has finished (S205). If it is determined that the unlocking motion has not finished (S205: No), the process of S205 is executed again. The determination as to whether or not the unlocking motion has finished can be made by determining whether or not a predetermined time period such as one or several seconds, for example, has elapsed. Alternatively, the determination can be made by analyzing the acceleration information measured by the sensor 16 and determining whether or not the motion such as shaking the mobile terminal device 1 ceases.

On the other hand, if it is determined that the unlocking motion has finished (S205: Yes), the determination unit 112 determines whether or not the acceleration information measured by the sensor 16 is normal (S206). For example, when the user did not perform any motion such as shaking the mobile terminal device 1 after turning on the power of the mobile terminal device 1, when the motion was insufficient, when, in contrast, the motion was so strong that the acceleration of the mobile terminal device 1 exceeds a detection limit, or when normal detection or storage was not carried out due to some other reason, it is determined that the measured acceleration information is not normal (S206: No) and S212 is entered. The process then enters personal authentication that uses direct input to the mobile terminal device 1.

On the other hand, if it is determined that the measured acceleration information is normal (S206: Yes), the transmission unit 113 transmits to the wearable device 2 a message requesting transmission of acceleration information (S207).

Then, the determination unit 112 determines whether or not acceleration information has been received from the wearable device 2 (S208). At S208, the determination unit 112 refers to a timer (not illustrated) set to a predetermined time period. Then, if it is determined that neither acceleration information has been received from the wearable device 2 nor the timer has expired, No is determined and the process of S208 is executed again. On the other hand, if it is determined that no acceleration information has been received from the wearable device 2 but the timer has expired, the process transfers to S212 and enters personal authentication applying direct input to the mobile terminal device 1.

At S208, if it is determined that acceleration information has been received from the wearable device 2, Yes is determined and the determination unit 112 determines whether or not the received acceleration information is normal (S209). At S209, when the message received from the wearable device 2 is an error message or when the information length of the acceleration information transmitted from the wearable device 2 is an improper length, for example, it is determined that the received acceleration information is not normal. When the near-field wireless communication system in use has a data error detection function and when an error is detected in the received data, it is also not determined that the received acceleration information is normal.

At S209, if it is determined that the received acceleration information is not normal (S209: No), the process transfers to S212 and enters personal authentication applying direct input to the mobile terminal device 1. On the other hand, if it is determined that the received acceleration information is normal (S209: Yes), the determination unit 112 determines whether or not the acceleration information measured by the mobile terminal device 1 matches the acceleration information measured by the wearable device 2 (S210). At S210, when it is determined that both pieces of acceleration information have a predetermined relationship, that is, both pieces of acceleration information match, or when both pieces of acceleration information have a correlation above a certain degree, Yes is determined. If Yes is determined, the lock control unit 116 releases the lock (S211). On the other hand, if it is determined that both pieces of acceleration information do not match (S210: No), the process transfers to S212 and enters personal authentication applying direct input to the mobile terminal device 1.

In a manner as described above, the process by the mobile terminal device 1 is executed.

Next, a process flow at the wearable device 2 will be described by using FIG. 8. FIG. 8 is a flowchart illustrating an example of a process executed by the wearable device 2, according to the first embodiment.

First, the receiving unit 211 of the wearable device 2 receives from the mobile terminal device 1 a message requesting starting of measurement of acceleration information and storage of the measured result (S301). Upon receiving the message, the measurement instruction unit 212 causes the sensor 25 to start measurement of acceleration information of the wearable device 2 and storage of the measured result (S302). After measurement of the acceleration information is started, the user wearing the wearable device 2 performs an unlocking motion such as shaking the mobile terminal device 1. The sensor 25 then measures changes in acceleration of the wearable device 2 caused by the unlocking motion. The sensor 25 then stores information of the acquired acceleration in the memory 22 as acceleration information.

Next, the determination unit 213 determines whether or not a transmission request for acceleration information has been received from the mobile terminal device 1 (S303). If it is determined that a transmission request for acceleration information has not been received from the mobile terminal device 1 (S303: No), the process of S303 is executed again. On the other hand, if it is determined that a transmission request for acceleration information has been received from the mobile terminal device 1 (S303: Yes), the determination unit 213 determines whether or not the acceleration information measured by the sensor 25 is normal (S304). The same process as in S206 can be used for the determination process at S304.

If it is determined that the acceleration information measured by the sensor 25 is normal (S304: Yes), the transmission unit 214 transmits the acceleration information to the mobile terminal device 1 (S305). On the other hand, if it is determined that the acceleration information measured by the sensor 25 is not normal (S304: No), the transmission unit 214 transmits an indication of failure in acquisition of acceleration information to the mobile terminal device 1 (S306).

In a manner as described above, the process by the wearable device 2 is executed.

Now, examples of formats of the messages transmitted between the mobile terminal device 1 and the wearable device 2 will be described by using FIG. 9A to FIG. 9C. FIG. 9A to FIG. 9C are general diagrams of formats of various messages according to the first embodiment.

Codes indicating a type of message are included in message formats. For example, code 0×01 illustrated in FIG. 9A represents a message from the mobile terminal device 1 to the wearable device 2. The code 0×01 is for a request for starting measurement of acceleration information and storage of the measured result. Code 0×02 illustrated in FIG. 9B also represents a message from the mobile terminal device 1 to the wearable device 2. The code 0×02 is for a request for transmission of acceleration information. Code 0×NN means a number NN in hexadecimal representation.

Code 0×03 represents a message from the wearable device 2 to the mobile terminal device 1. The code 0×03 is for transmission of the acceleration information measured by the wearable device 2 to the mobile terminal device 1. This message includes "information length" that indicates a length of motion information in addition to the type code. Further, there is subsequent acceleration information as illustrated in FIG. 9C.

Figure 10:
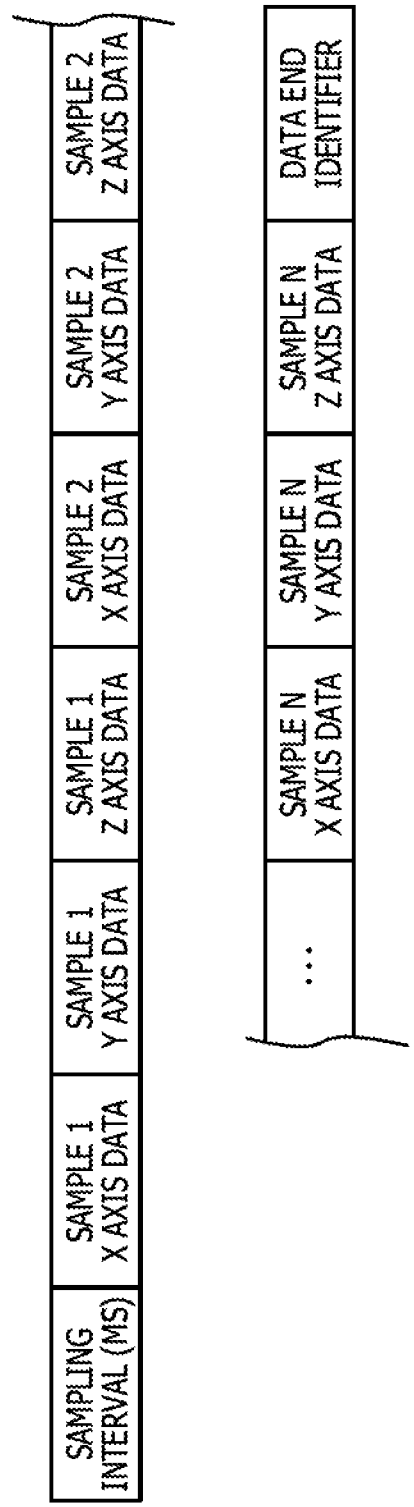
FIG. 10 is a general diagram illustrating an example of acceleration information according to the first embodiment.

FIG. 10 is a general diagram illustrating an example of acceleration information according to the first embodiment. As illustrated in FIG. 10, information of a sampling interval that is a reading period of the acceleration sensor output is stored in the head of the acceleration information. Further, following the information of the sampling interval, sampling data for acceleration of respective directions in the three-dimensional system (X axis, Y axis, and Z axis) are stored in a temporal manner. Finally, an identifier that indicates the end of data is added and stored.

When the end of an unlocking motion is determined according to whether or not a predetermined time period has elapsed, the acceleration information has a fixed length, because the number of sampling data is fixed in advance. In this case, the "information length" of FIG. 9C may be omitted. The acceleration information stored by the mobile terminal device 1 and the acceleration information stored by the wearable device 2 may not necessarily be of the same format.

Next, advantages of the present embodiment will be described for the case where, assuming that a valid user leaves his/her seat with the mobile terminal device 1 left placed on a desk, a malicious third party attempts an unauthorized use of the mobile terminal device 1. When the distance between the valid user and the third party is so distant that a near-field communication such as Bluetooth is not established, no unlocking process utilizing the wearable device 2 can be executed. Without performing of unlocking operation of the mobile terminal device 1 through a personal authentication procedure using direct input, the third party is unable to use the mobile terminal device 1.

On the other hand, when the distance between the valid user and the third party is short, such as when, while the valid user is taking a nap, the third party attempts to operate the mobile terminal device 1 placed near the valid user, a near-field communication such as Bluetooth is possible. Therefore, the unlocking process utilizing the wearable device 2 as illustrated in FIG. 4 appears to be executable. Even when the third party performs a motion of shaking the mobile terminal device 1, however, the wearable device 2 carried by the valid user does not detect that motion. Therefore, since both pieces of acceleration information do not match and no effective correlation thereof is acquired, unlocking is not executed.

According to the first embodiment, acceleration information of the mobile terminal device 1 and acceleration information of the wearable device 2 are compared and the relationship thereof is determined. Then, when both pieces of acceleration information are determined to have a predetermined relationship, the mobile terminal device 1 is unlocked. According to this method, comparison of both pieces of acceleration information allows for determining that the user wearing the wearable device 2 has held the mobile terminal device 1 by the hand, so that a risk of a use of the mobile terminal device 1 by a third party against the valid user's will can be reduced. Therefore, a simpler unlocking operation with high security can be performed.

Second Embodiment

Next, a second embodiment will be described. In the first embodiment, measurement of acceleration information and storage of the measured result of the mobile terminal device 1 and the wearable device 2 are triggered by user's operation to start use of the mobile terminal device 1. In contrast, the second embodiment is featured in that, prior to an operation to start use of the mobile terminal device 1, acceleration information has been stored in the mobile terminal device 1 and the wearable device 2. A system for implementing the second embodiment can use the system configuration exemplified in FIG. 1 to FIG. 5, and thus description thereof will be omitted.

In general, when a user intends to use the mobile terminal device 1, the user will perform some motion for holding the mobile terminal device 1 by the hand, such as a motion of picking up the mobile terminal device 1 that has been placed on a desk, a motion of taking it out of a pocket, or the like. In the following second embodiment, such a motion itself is utilized as an unlocking motion.

Figure 11:
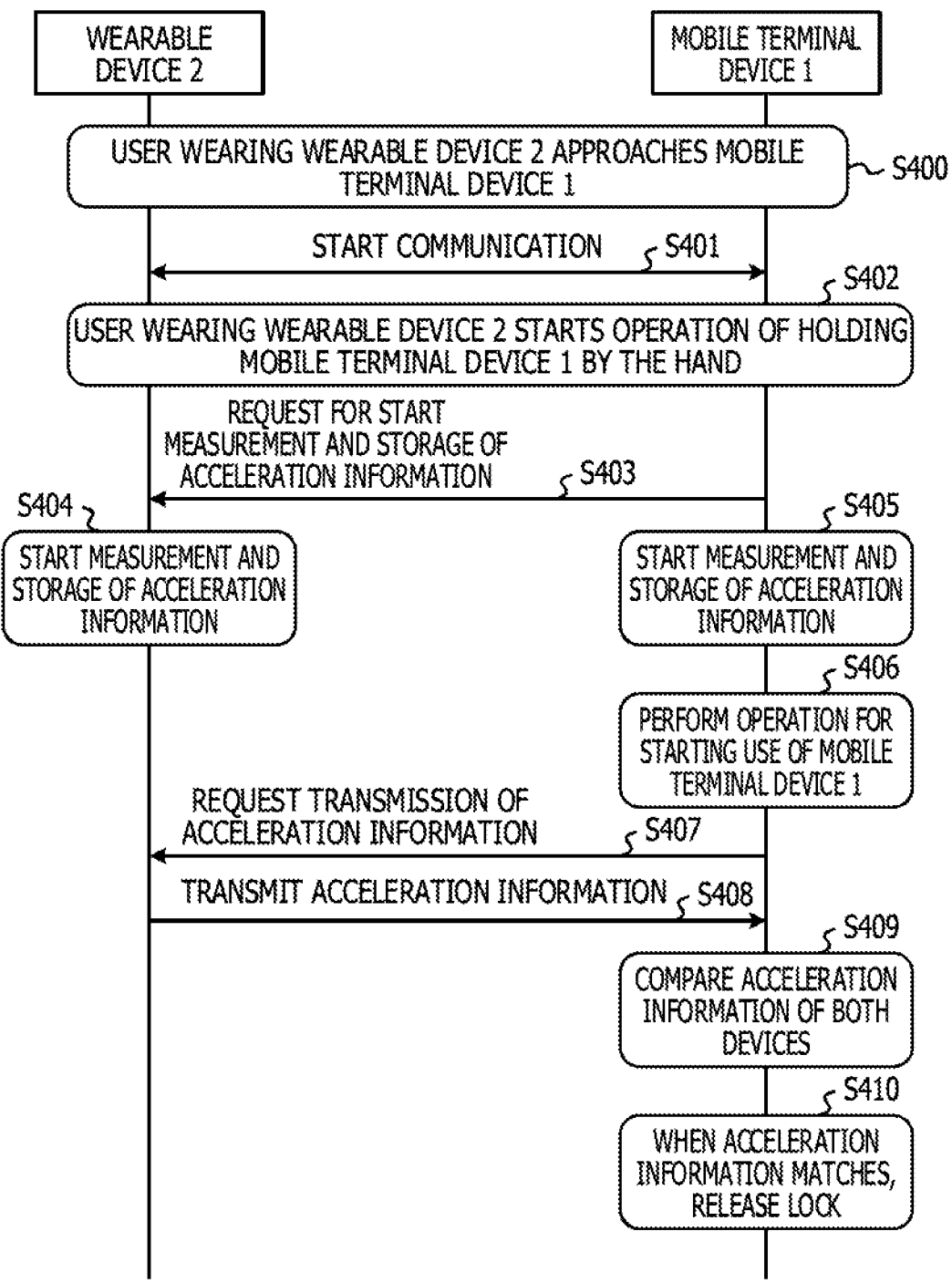
FIG. 11 is a sequence diagram illustrating an example of a processing method by a system, according to a second embodiment.

In the following, the second embodiment will be described with reference to FIG. 11. FIG. 11 is a sequence diagram illustrating an example of a processing method by the system, according to the second embodiment.

First, the user wearing the wearable device 2 approaches the mobile terminal device 1 (S400). Then, when the user enters a range where Bluetooth communication can be established, for example, mutual communication is started (S401).

Then, the user wearing the wearable device 2 starts a motion of holding the mobile terminal device 1 by the hand (S402). At S402, in order to use the mobile terminal device 1, the user starts some "motion of holding it by the hand" such as picking up the mobile terminal device 1 placed on a desk, taking it out of a pocket, taking it out of a bag, or the like. At this time, the motion generally involves a motion with an upward or horizontal movement at a certain speed or faster. It is thus possible to assume a detection of such acceleration as a start of a "motion of holding it by the hand". In this assumption, so a high accuracy is unnecessary. Because, even when the motion is not a motion for starting a use in fact, the process will be cancelled somewhere in the subsequent process, which neither causes any inconvenience to the user nor causes malfunction.

Upon detecting the start of such a "motion of holding it by the hand", the mobile terminal device 1 transmits to the wearable device 2 a message indicating a start request for starting a process of measuring acceleration information and storing the measured result (S403). The wearable device 2 that has received the message then starts measurement of acceleration information of the wearable device 2 and storage of the measured result (S404). On the other hand, the mobile terminal device 1 also starts measurement of acceleration information of the mobile terminal device 1 and storage of the measured result (S405).

Next, the user who has held the mobile terminal device 1 by the hand performs an operation to start use of the mobile terminal device 1, such as turning on the power of the mobile terminal device 1, for example (S406). Upon detecting the operation to start a use, the mobile terminal device 1 transmits to the wearable device 2 a transmission request for transmission of acceleration information (S407). The wearable device 2 that has received the transmission request then transmits acceleration information that has been stored by itself to the mobile terminal device 1 (S408).

Next, the mobile terminal device 1 compares the acceleration information measured and stored by the mobile terminal device 1 with the acceleration information received from the wearable device 2 (S409). Specifically, it is determined whether or not the acceleration information measured by the mobile terminal device 1 matches the acceleration information measured by the wearable device 2. When both pieces of acceleration information match, the mobile terminal device 1 releases the lock (S410).

In a manner as described above, unlocking of the mobile terminal device 1 by using the wearable device 2 can be executed.

In the second embodiment, the time period from the time of the user's motion of holding the mobile terminal device 1 by the hand to the time of performing the operation to start a use such as pressing a power key varies, and the number of sampling data of measured acceleration also varies. Thus, the acceleration information illustrated in FIG. 10 has a variable length, and thus the "information length" described with respect to FIG. 9C is prerequisite.

Figure 12:
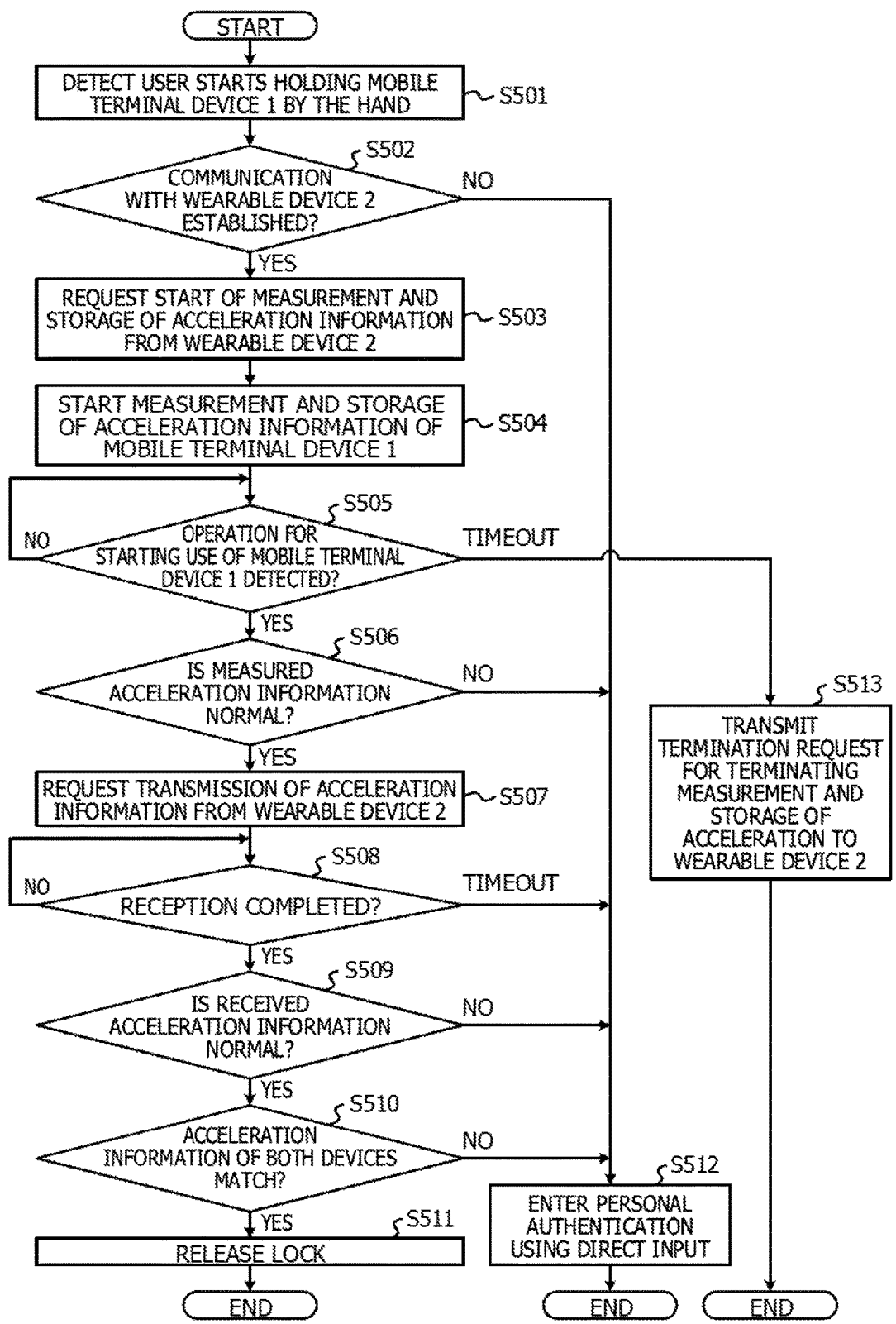
FIG. 12 is a flowchart illustrating an example of a process of a mobile terminal device, according to the second embodiment.

In the following, a process flow at the mobile terminal device 1 will be described by using FIG. 12. FIG. 12 is a flowchart illustrating an example of a process executed by the mobile terminal device, according to the second embodiment.

First, the detection unit 111 detects that the user starts a motion of holding the mobile terminal device 1 by the hand (S501). Next, the determination unit 112 determines whether or not a near-field communication with the wearable device 2 is established (S502). If it is determined that a near-field communication with the wearable device 2 is not established (S502: No), in order to unlock the mobile terminal device 1, the process enters personal authentication applying direct input to the mobile terminal device 1 (S512). On the other hand, if it is determined that a near-field communication with the wearable device 2 is established (S502: Yes), S503 is entered. Each process of S503 and S504 executed after S503 is substantially the same as each process of S203 and S204 of FIG. 7, respectively, and thus description thereof will be omitted.

After the process of S504, the determination unit 112 determines whether or not an operation to start use of the mobile terminal device 1, such as turning on the power of the mobile terminal device 1, is detected (S505). At S505, the determination unit 112 refers to a timer (not illustrated) set to a predetermined time period, and if it is determined that neither operation to start use of the mobile terminal device 1 is detected nor the timer has expired, No is determined and the process of S505 is executed again. On the other hand, if it is determined that an operation to start use of the mobile terminal device 1 is not detected but the timer has expired, the control unit 11 determines that the user has no intention of using the mobile terminal device 1. The transmission unit 113 then transmits to the wearable device 2 a termination request for terminating measurement and storage of acceleration (S513), and the process ends.

On the other hand, if it is determined that an operation to start use of the mobile terminal device 1 is detected (S505: Yes), the control unit 11 determines whether or not the acceleration information measured by the sensor 16 is normal (S506). If it is determined that the measured acceleration information is not normal (S506: No), the process transfers to S512 and enters personal authentication applying direct input to the mobile terminal device 1.

On the other hand, if it is determined that the measured acceleration information is normal (S506: Yes), the control unit 11 transmits to the wearable device 2 a message requesting transmission of the acceleration information (S507). Each process of S508, S509, S510, and S511 executed after S507 is substantially the same as each process of S208, S209, S210, and S211 illustrated in FIG. 7, respectively, and thus description thereof will be omitted.

In a manner as described above, the process by the mobile terminal device 1 is executed.

The process by the wearable device 2 is substantially the same as the process illustrated in FIG. 8, and thus the description thereof will be omitted.

In the second embodiment, prior to an operation to start use of the mobile terminal device 1, acceleration information has been stored in the mobile terminal device 1 and the wearable device 2. According to this method, the user does not have to consciously perform a motion such as shaking the mobile terminal device 1 for releasing the lock. The user is able to immediately release the lock only by holding the mobile terminal device 1 by the hand and pressing the power key. This method can reduce the time for releasing the lock and therefore improve convenience at the user.

Third Embodiment

Next, a third embodiment will be described. When a battery capacity of the mobile terminal device 1 and/or the wearable device 2 is sufficient, measurement and storage of acceleration information can be triggered by establishment of a communication between the mobile terminal device 1 and the wearable device 2, rather than triggered by a "motion of holding it by the hand" as in the second embodiment. Since a system for implementing the third embodiment can use the system configuration exemplified in FIG. 1 to FIG. 3, description thereof will be omitted.

Figure 13:
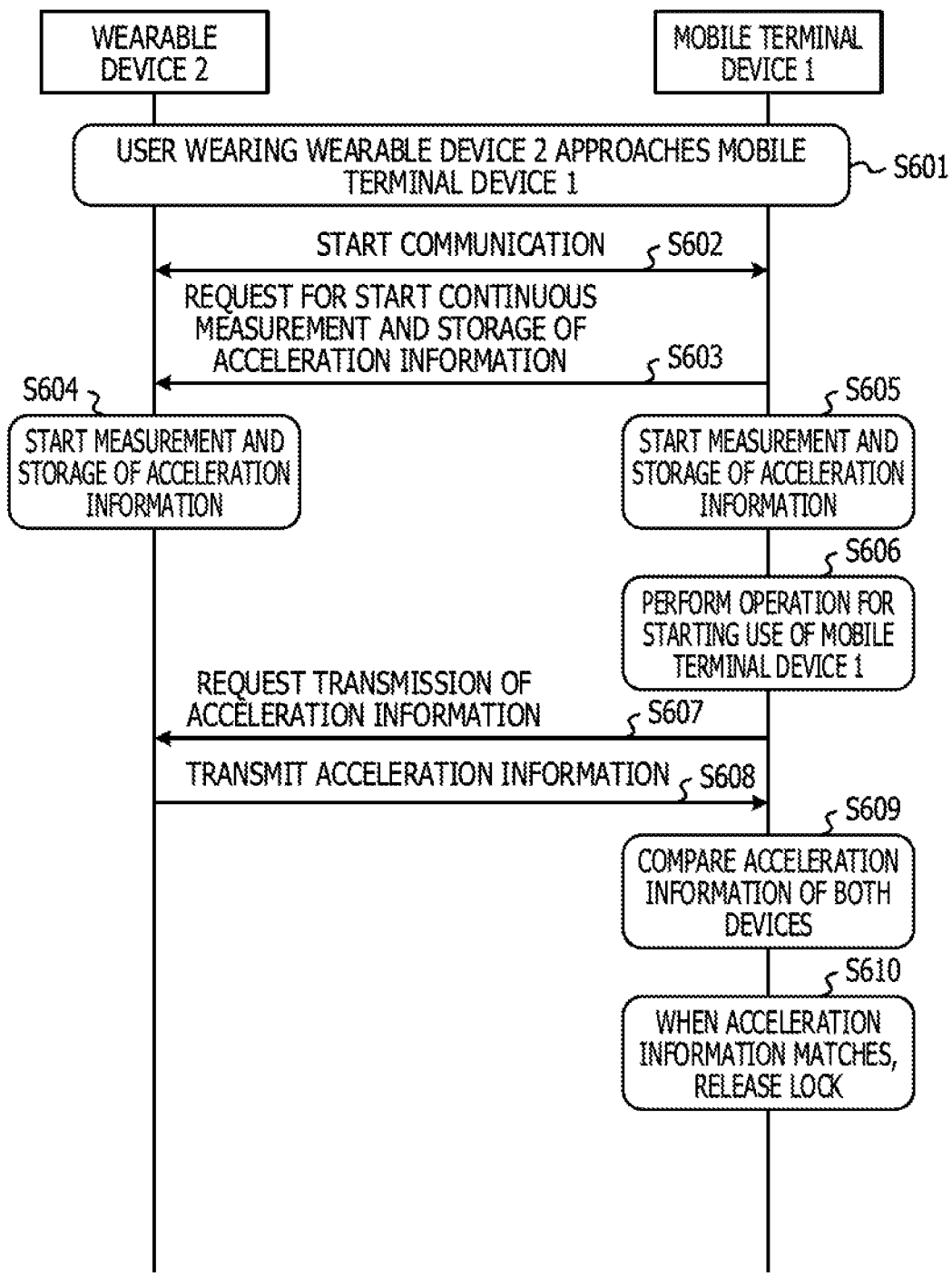
FIG. 13 is a sequence diagram illustrating an example of a processing method by a system, according to a third embodiment.

In the following, the third embodiment will be described with reference to FIG. 13. FIG. 13 is a sequence diagram illustrating an example of a processing method by the system, according to the third embodiment.

First, a user wearing the wearable device 2 approaches the mobile terminal device 1 (S601). Then, when the user enters a range where Bluetooth communication can be established, for example, mutual communication is started (S602).

Upon the start of the communication of both devices, the mobile terminal device 1 transmits to the wearable device 2 a message indicating a start request for starting a process of measuring acceleration information at all times and storing the measured result (S603). Then, the wearable device 2 that has received the message starts measurement of acceleration information of the wearable device 2 and storage of the measured result (S604). On the other hand, the mobile terminal device 1 also starts measurement of acceleration information of the mobile terminal device 1 and storage of the measured result (S605).

Here, the mobile terminal device 1 and the wearable device 2 may update information stored in the memories 12 and 22 at all times so as to store the measured acceleration information for a predetermined time period (for several seconds to several ten seconds), respectively. That is, acceleration information for a predetermined time period only is stored in the memories 12 and 22 by erasing the previous data obtained before the predetermined time period and overwriting newly obtained data. This method allows for saving the capacities of the memories 12 and 22.

Next, the user who has held the mobile terminal device 1 by the hand performs an operation to start use of the mobile terminal device 1 such as turning on the power of the mobile terminal device 1, for example (S606). Each process of S607 to S610 executed after S606 is substantially the same as each process of S407 to S410 illustrated in FIG. 11, respectively, and thus description thereof will be omitted.

In a manner as described above, unlocking of the mobile terminal device 1 by using the wearable device 2 can be executed.

Figure 14:
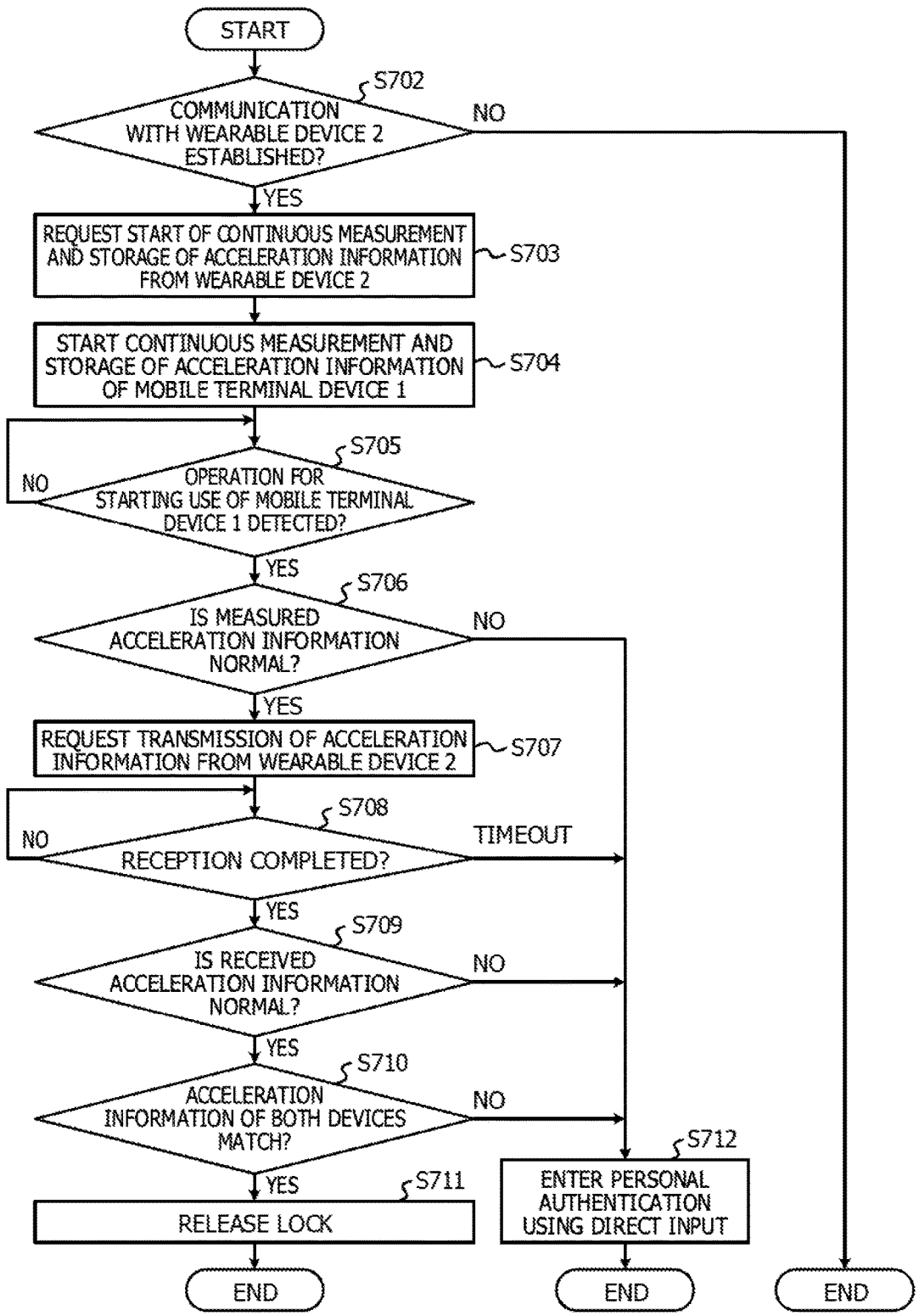
FIG. 14 is a flowchart illustrating an example of a process of a mobile terminal device, according to the third embodiment.

In the following, a process flow at the mobile terminal device 1 will be described in detail by using FIG. 14. FIG. 14 is a flowchart illustrating an example of a process executed by the mobile terminal device, according to the third embodiment.

First, the control unit 11 confirms whether or not a near-field communication with the wearable device 2 is established (S702). If it is determined that a near-field communication with the wearable device 2 is not established (S702: No), the process ends, because pieces of acceleration information of both devices are not compared even if they are measured. On the other hand, if it is determined that a near-field communication with the wearable device 2 is established (S702: Yes), the control unit 11 transmits to the wearable device 2 a message indicating a request for starting a process of measuring acceleration information at all times and storing the measured result (S703). The control unit 11 then causes the sensor 16 to start continuous measurement of acceleration information of the mobile terminal device 1 and storage of the measured result (S704).

After the process of S704, the control unit 11 determines whether or not an operation to start use of the mobile terminal device 1 such as turning on the power of the mobile terminal device 1, for example, is detected (S705). If it is determined that an operation to start use of the mobile terminal device 1 is not detected (S705: No), the process of S705 is executed again. On the other hand, if it is determined that an operation to start use of the mobile terminal device 1 is detected (S705: Yes), S706 is entered. Each process of S706 to S712 is substantially the same as each process of S506 to 512 illustrated in FIG. 12, respectively, and thus description thereof will be omitted.

Figure 15:
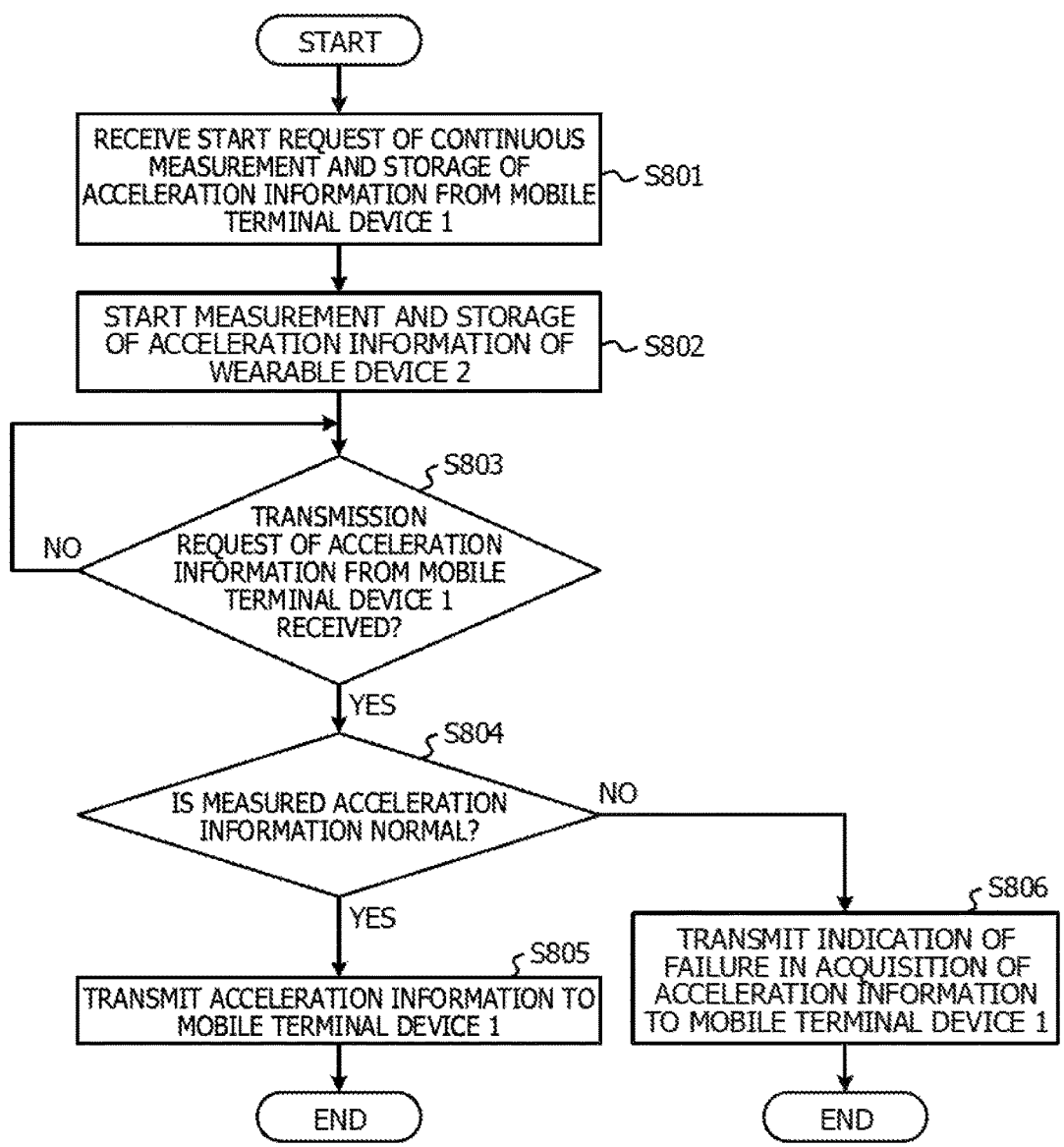
FIG. 15 is a flowchart illustrating an example of a process of a wearable device, according to the third embodiment.

FIG. 15 is a flowchart illustrating an example of a process executed by the wearable device, according to the third embodiment.

In the process executed by the wearable device, first, at S801, the control unit 21 of the wearable device 2 receives from the mobile terminals device 1 a message indicating a start request for starting continuous measurement of acceleration information and storage of the measured result. Each process of S802 to S806 executed after S801 is substantially the same as each process of S302 to 306 illustrated in FIG. 8, respectively, and thus description thereof will be omitted.

In the third embodiment, measurement and storage of acceleration information are triggered by establishment of a communication between the mobile terminal device 1 and the wearable device 2. In this method, in a similar manner to the second embodiment, the user is able to immediately release the lock only by holding the mobile terminal device 1 by the hand and pressing the power key without consciously performing a motion for releasing the lock. According to the third embodiment, since the timing of starting measurement and storage of acceleration information is earlier than that in the second embodiment, a change in the acceleration caused by a motion of holding the mobile terminal device 1 by the hand is ensured to be acquired as the acceleration information.

As set forth, while the preferable embodiments of the present disclosure have been described in detail, the present disclosure is not limited to a particular embodiment, but various modifications and alternations are possible. For example, in the second or third embodiment, it is considered that, when the time period from the time of holding the mobile terminal device 1 by the hand to the time of performing an operation to start a use is quite short, the information amount of the acceleration information is reduced and thus no comparison determination of the acceleration information may be executed or no matching may be determined. In such a case, at S512 of FIG. 12 or S712 of FIG. 14, in place of entering a personal authentication procedure using direct input, a message such as "Please do an unlocking motion" may be displayed to the user by using the display device 14 to facilitate an unlocking motion so that the process of the first embodiment is executed, for example.

In executing the comparison determination for acceleration information matching, in addition to the acceleration information, information of the time at which the acceleration information is stored may be added. According to this method, reference to the time information allows for improvement of accuracy in the determination as to whether or not acceleration information matches at any one of the mobile terminal device 1 and the wearable device 2.

A computer program that causes a computer to execute the functions of respective units of the mobile terminal device and the control method as described above, and a non-transitory computer-readable storage medium in which the program is stored are included in the scope of the present disclosure. The non-transitory computer-readable storage medium herein is a memory card such as an SD memory card, for example. The computer program described above is not limited to the program stored in the storage medium described above. For example, it may be a program transmitted via telecommunication lines, wireless or wired communication lines, networks such as the Internet, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by a processor included in an information processing device that includes an acceleration sensor and that restricts input operation to the information processing device when the information processing device is locked, the control method comprising:

establishing a wireless communication between the information processing device and a wearable device when the wearable device approaches the information processing device and a distance between the information processing device and the wearable device becomes within a predetermined range;

transmitting, to the wearable device, a first request for measuring an acceleration of the wearable device when an acceleration is detected before detecting an operation to start use of the information processing device;

acquiring first acceleration information of the information processing device by the acceleration sensor;

determining whether the operation to start use of the information processing device is detected within a predetermined time period;

transmitting a second request for transmitting second acceleration information of the wearable device when it is determined that the operation is detected within the predetermined time period;

receiving the second acceleration information transmitted from the wearable device in response to the second request; and releasing locking of the information processing device when the first acceleration information corresponds to the second acceleration information.

2. The control method according to claim 1, wherein the acceleration is generated by a motion of the information processing device caused by a user.

3. The control method according to claim 1, wherein the first acceleration information includes a transition of changes in acceleration of the information processing device that has been acquired for a predetermined time period, and the second acceleration information includes a transition of changes in acceleration of the wearable device that has been acquired for a predetermined time period.

4. The control method according to claim 1, further comprising determining that the first acceleration information corresponds to the second acceleration information when the first acceleration information partially matches the second acceleration information.

5. The control method according to claim 1, further comprising:

determining that the first acceleration information corresponds to the second acceleration information when a correlation between the first acceleration information and the second acceleration information is greater than or equal to a predetermined threshold.

6. The control method according to claim 1, further comprising:

determining whether the first acceleration information is normal; and requesting transmission of the second acceleration information from the wearable device, when it is determined that the first acceleration information is normal.

7. The control method according to claim 1, further comprising:

determining whether the first acceleration information is normal; and starting personal authentication applying user's input operation to the information processing device for releasing locking of the information processing device when it is determined that the first acceleration information is not normal.

8. The control method according to claim 1, further comprising:

determining whether the second acceleration information is normal; and determining whether the first acceleration information matches the second acceleration information when it is determined that the second acceleration information is normal.

9. The control method according to claim 8, further comprising:

starting personal authentication by applying user's input operation to the information processing device for releasing the lock when it is determined that the second acceleration information is not normal.

10. The control method according to claim 8, wherein the determining whether the second acceleration information is normal includes determining that the second acceleration information is not normal when the second acceleration information is an error message.

11. The control method according to claim 8, wherein the determining whether the second acceleration information is normal includes determining that the second acceleration information is not normal when a predetermined time has passed under a situation that no acceleration information has been received from the wearable device.

12. The control method according to claim 1, wherein the establishing includes establishing the wireless communication when a user wearing the wearable device moves to pick up the information processing device and thus a distance between the information processing device and the wearable device becomes short enough for the wireless communication to be established.

13. The control method according to claim 12, wherein the operation to start use of the information processing device is detected when the user turns on a power of the information processing device after picking up the information processing device.

14. The control method according to claim 1, wherein formats of the first request and the second request respectively includes a code indicating a type of message.

15. The control method according to claim 14, wherein the code represents one of a first message from the information processing device to the wearable device and is for a request for starting measurement of the second acceleration information and storage of a result of the measurement, a second message from the information processing device to the wearable device and is for a request for transmission of the second acceleration information, and a third message from the wearable device to the information processing device and is for transmission of the second acceleration information measured by the wearable device to the information processing device.

16. An information processing device that restricts input operation to the information processing device when the information processing device is locked, the information processing device comprising:

an acceleration sensor; and a processor coupled to the acceleration sensor and configured to:

establish a wireless communication between the information processing device and a wearable device when the wearable device approaches the information processing device and a distance between the information processing device and the wearable device becomes within a predetermined range, transmit, to the wearable device, a first request for measuring an acceleration of the wearable device when an acceleration is detected before detecting an operation to start use of the information processing device, acquire first acceleration information of the information processing device by the acceleration sensor, determine whether the operation to start use of the information processing device is detected within a predetermined time period, transmit a second request for transmitting second acceleration information of the wearable device when it is determined that the operation is detected within the predetermined time period, receive the second acceleration information transmitted from the wearable device in response to the second request, and release locking of the information processing device when the first acceleration information corresponds to the second acceleration information.

17. A non-transitory computer-readable recording medium that causes a processor included in an information processing device to execute a process, the process comprising:

establishing a wireless communication between the information processing device and a wearable device when the wearable device approaches the information processing device and a distance between the information processing device and the wearable device becomes within a predetermined range;

transmitting, to the wearable device, a first request for measuring an acceleration of the wearable device when an acceleration is detected before detecting an operation to start use of the information processing device;

acquiring first acceleration information of the information processing device by the acceleration sensor;

determining whether the operation to start use of the information processing device is detected within a predetermined time period;

transmitting a second request for transmitting second acceleration information of the wearable device when it is determined that the operation is detected within the predetermined time period;

receiving the second acceleration information transmitted from the wearable device in response to the second request; and releasing locking of the information processing device when the first acceleration information corresponds to the second acceleration information.

* * * * *